May 26, 1925.  1,539,180
A. H. B. GORE
VALVE
Filed Oct. 18, 1922

INVENTOR.
Arthur H. B. Gore
By
Attorney.

Patented May 26, 1925.

1,539,180

UNITED STATES PATENT OFFICE.

ARTHUR H. B. GORE, OF MARICOPA, CALIFORNIA.

VALVE.

Application filed October 18, 1922. Serial No. 595,408.

*To all whom it may concern:*

Be it known that I, ARTHUR H. B. GORE, a citizen of the United States, and a resident of Maricopa, in the county of Kern and State of California, have invented new and useful Improvements in Valves, of which the following is a specification.

This invention relates in general to valves, and more particularly a valve or nozzle adapted to be employed when filling receptacles with fluids. The main object of my invention is to provide an improved valve, or nozzle for the above purpose and particularly applicable to oil tanks and tank cars whereby the oil, or other liquid with which the tanks are filled, may be supplied from a suitable source to the tanks in a uniform volume, and automatically operable when a predetermined level of the fluid in the tanks is reached for positively shutting off the further supply of fluid to the tanks, thus eliminating waste of the fluid, loss of time and great inconvenience which is generally attendant upon the filling of such tanks with methods now in vogue.

It is also an object of this invention to provide a filling nozzle for fluid receptacles adaptable for use with any kind of fluid, and embodying an integral body with an automatically operable shut-off valve therein and a float controlled operating member connected with a float adapted to be suspended into the receiving tank, for operating the shut-off valve when a proper or maximum level of the fluid is attained in the tanks. Still other objects may appear as the description progresses.

I have illustrated one practical embodiment of my invention in the accompanying drawings, subject to modification within the scope of the appended claims without departing from the spirit thereof.

Figure 2:
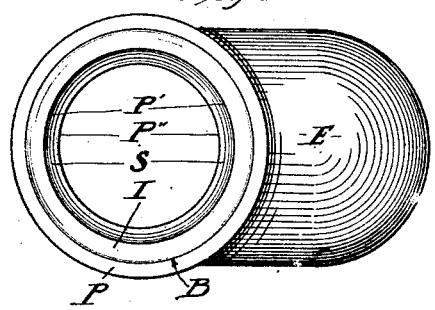
Fig. 2 is a top plan view of the same.
Figure 3:
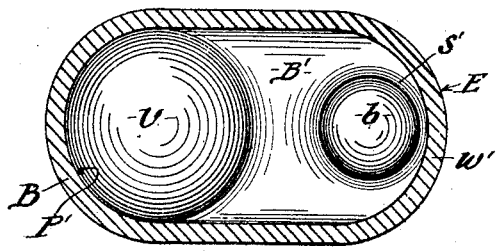
Fig. 3 is a sectional plan on line 3—3 of Fig. 1.

In a preferred form, such as shown in the drawings, B represents an integral body structure partaking substantially of the nature of a standard pipe fitting and having an inlet portion I and an outlet portion O longitudinally alined on the body. Inlet I may be externally threaded, as shown, to receive a section of pipe P, by means of which the fluid may be conveyed from a source of supply to the nozzle. Outlet O may also be externally threaded so as to receive a short section of pipe constituting a discharge nozzle N which is adapted to be suspended within the inlet of a receptacle or tank as at R.

Body B has a longitudinal passage P' extending therethrough for affording communication between the pipe P and nozzle N, so that when the valve is open the fluid may flow uninterruptedly therethrough.

Figure 1:
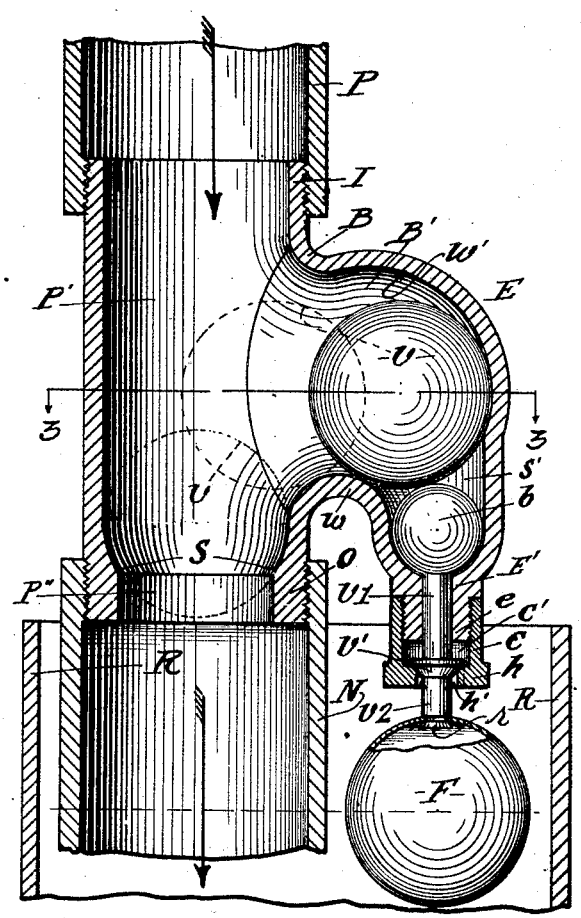
Fig. 1 is a sectional elevation of my improved filling nozzle.
Figure 4:
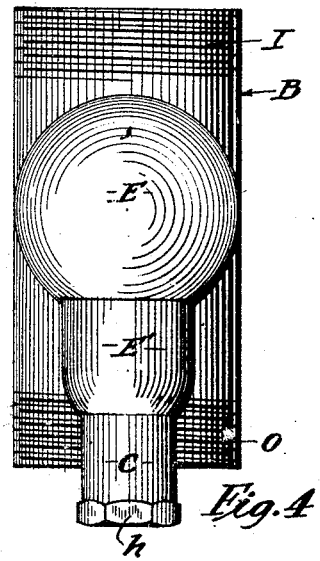
Fig. 4 is a side elevation as viewed from the right hand side of Fig. 1.
Figure 5:
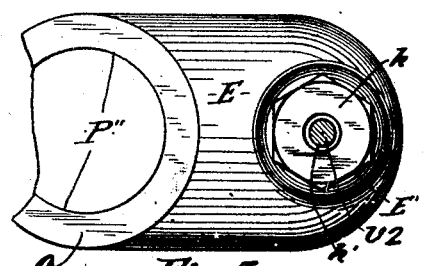
Fig. 5 is a bottom plan of the nozzle, partially broken away.

An extension E is provided on one side of body B and has a lower arched wall W and an outer curved wall W' with an internal chamber B' formed therebetween for loosely receiving and supporting a ball valve V when the valve is open. The arrangement of walls W and W' are such that the valve V will seat on the outer portion of the arched wall W over the vertical center line of the curve of said wall, and will be thus held in position against the outer portion of wall W', as shown in Fig. 1, by gravity.

An extension E' is provided integral with and projecting downwardly from the extension E and has a semi-spherical recess S' communicating with the chamber B' which is adapted to receive and hold a ball operating member $b$ slidably mounted in a reduced end portion $e$ by means of a valve stem $V^1$. Said valve stem has a valve V' of the poppet type thereon below the end of portion $e$ and said portion is bored to receive the stem $V^1$, as shown. Portion $e$ is threaded to receive a valve cap C, the end of which abuts a shoulder on the lower end of extension E' and said cap serves to enclose the valve V'.

A valve seat $h'$ is provided in the lower end of the cap C and is tapered, or beveled to correspond to the bevel of the valve, while the lower portion $V^2$ of the valve stem projects through the end of the cap and is attached at its lower end to a ball float F, hollow as shown, and of light weight. Cap C is threaded on the end of extension E' by means of a wrench applied to a hexagonal portion $h$ formed on the cap.

Stem $V^2$ is riveted to the float F as at $r$, or it may be otherwise suitably attached thereto, and the stem is of a proper length to suspend the float into the receptacle R and below the maximum fluid level thereof.

Ball valve V is adapted to seat in a correspondingly formed valve seat S formed internally of the outlet O so as to positively shut off the supply of fluid from the tank or receptacle R when a proper level is attained.

The operation is as follows:

The nozzle being first properly attached to the pipe P and a source of supply, is suitably held in position over the inlet of the tank R with the nozzle N thereof projecting downwardly into the tank. The ball valve V is then raised into the position shown in Fig. 1 for holding the valve open and the fluid may be pumped or supplied by gravity to the tank R until a maximum level with the tank is attained, whereupon the float F will be elevated, the valve V' opened and the ball operating member b will be thrust upwardly against the lower and outer portion of the periphery of ball valve V, and said valve will be moved over the arched wall W and will automatically fall downwardly into the passage P' and seat in the valve seat S. Thus, the supply of fluid will be automatically shut off, and immediately upon the closing of the valve V the pressure in the passage P' and chamber B' will be exerted against the ball member b and upper side of valve V', thus forcing the float F downwardly into the fluid within the tank R, and closing valve V' against the leakage of the fluid therethrough.

It will be noted from the foregoing description that the valves V and V' co-operate with each other for positively and completely shutting off the supply of the fluid to the tank R when the proper level is attained. Other tanks may be filled, one after the other in a similar manner and the level of the fluid in tank R is determined by the depth of the float F in the tank, and the elevation of the entire structure thereabove.

What I claim is:

1. A filling nozzle for tanks and the like having an inlet and outlet vertically alined for receiving and discharging a fluid into a tank, a ball valve adapted to be held in the lower portion of said nozzle for closing said outlet, a laterally disposed chamber communicating with and above said outlet for normally supporting said valve when said outlet is open, an operating member including a float adapted to be suspended into said tank and provided with means thereon for engagement with and dislodging said valve from said chamber for closing said outlet, when a predetermined level of the liquid is attained in the tank, said operating member being extended from said nozzle for connection with said float, and an auxiliary valve connected with said chamber and adapted to be closed by the pressure in said nozzle when said main valve is closed, for preventing the leakage of the fluid around the operating member, said chamber having a lower wall portion engaging the periphery of said ball valve whereby said valve will be held in open position by gravity.

2. A device of the character described including a filling nozzle attachable to a receptacle and provided with an inlet and outlet, a ball valve for closing said outlet, a lateral extension on said nozzle provided with a major and a minor chamber therein, said major chamber being arranged to receive and hold said valve in open position by force of gravity, an operating member held in said minor chamber for engagement with said ball valve when in open position, an auxiliary valve connected with said operating member, slidably supported in said extension and having a stem extended therefrom, and a float connected with said stem and suspended into said receptacle, whereby when a predetermined level of the fluid is attained in said receptacle said float will be elevated for effecting the engagement of said operating member with and for closing said ball valve.

3. A device of the character described including a filling nozzle attachable to a receptacle for holding liquids and provided with an inlet and outlet, a ball valve for closing said outlet, a lateral extension on said nozzle provided with a major and a minor chamber therein, said major chamber being arranged to receive and hold said valve is open position by force of gravity, an operating member held in said minor chamber for engagement with said ball valve when in open position, an auxiliary valve connected with said operating member, slidably supported in said extension and having a stem extended therefrom, a float connected with said stem and suspended into said receptacle, whereby, when a predetermined level of the fluid is attained in said receptacle said float will be elevated for effecting the engagement of said operating member with and for closing said ball valve, said auxiliary valve adapted for closing subsequent to the closing of said ball valve.

4. A filling nozzle of the character described including a body having an inlet at the top thereof and an outlet at the bottom thereof, a lateral extension intermediate said inlet and outlet having a major and a minor chamber in communication with said inlet and outlet, a ball valve for closing said outlet and adapted to be manually moved into position in said major chamber for holding said outlet open to the passage of liquid therethrough, an auxiliary valve in the lower end of said extension having a stem extended upwardly into said minor chamber and adapted for engagement with said valve, and a float connected with said valve and adapted to be extended into receptacles to be filled whereby when the level of the liquid in said receptacle reaches a predetermined point, said float will be elevated for engaging said stem with said ball valve for dislodging said valve and closing said outlet.

ARTHUR H. B. GORE.

Witnesses:
  IRENE BREEN,
  LUTHER L. MACK.